United States Patent
Shaheen

(10) Patent No.: US 8,529,167 B2
(45) Date of Patent: Sep. 10, 2013

(54) CUTTING INSERT AND CUTTING TOOL

(75) Inventor: Philip Shaheen, Tarshiha (IL)

(73) Assignee: Iscar, Ltd., Tefen (IL)

( * ) Notice: Subject to any disclaimer, the term of this patent is extended or adjusted under 35 U.S.C. 154(b) by 938 days.

(21) Appl. No.: 12/638,706

(22) Filed: Dec. 15, 2009

(65) Prior Publication Data
US 2010/0189521 A1 Jul. 29, 2010

(30) Foreign Application Priority Data
Jan. 26, 2009 (IL) .......................... 196724

(51) Int. Cl.
B32B 27/02 (2006.01)
B23B 27/22 (2006.01)

(52) U.S. Cl.
USPC .......................... 407/113; 407/114

(58) Field of Classification Search
USPC ................. 407/113, 114, 115, 116, 66, 67
See application file for complete search history.

(56) References Cited

U.S. PATENT DOCUMENTS

| 5,593,255 A * | 1/1997 | Satran et al. .......... 407/113 |
| 5,921,721 A * | 7/1999 | Hintze et al. ........... 407/113 |
| 6,171,031 B1 * | 1/2001 | LaFlamme ............ 407/113 |
| 6,241,430 B1 * | 6/2001 | Norstrom .............. 407/114 |
| 6,257,807 B1 * | 7/2001 | Heinloth .............. 407/113 |
| 6,599,062 B1 | 7/2003 | Oles et al. |
| 7,014,395 B2 * | 3/2006 | Daiguji et al. ......... 407/113 |
| 7,553,112 B1 | 6/2009 | Hecht et al. |
| 7,934,891 B2 * | 5/2011 | Jonsson et al. ......... 407/114 |
| 2007/0003384 A1 | 1/2007 | Smilovici et al. |

FOREIGN PATENT DOCUMENTS

DE 36 10 016 10/1987

OTHER PUBLICATIONS

International Search Report in PCT/IL2009/001228, dated Apr. 27, 2010.

* cited by examiner

*Primary Examiner* — Will Fridie, Jr.
(74) *Attorney, Agent, or Firm* — Womble Carlyle

(57) ABSTRACT

A double-sided cutting insert has top and bottom surfaces and two major side surfaces connected by two minor side surfaces. Each major side surface has two distinct relief surfaces which are inclined in opposite directions and merge at a transition surface extending between top and bottom surfaces. A first major cutting edge is defined between the first relief surface and the top surface and a second major cutting edge is defined between the second relief surface and the bottom surface. Each major cutting edge is tangent to an associated transition cutting edge defined between the transition surface and the insert top or insert bottom surface. An insert holder for the insert has three support sections accordant with three abutment sections of the insert.

26 Claims, 5 Drawing Sheets

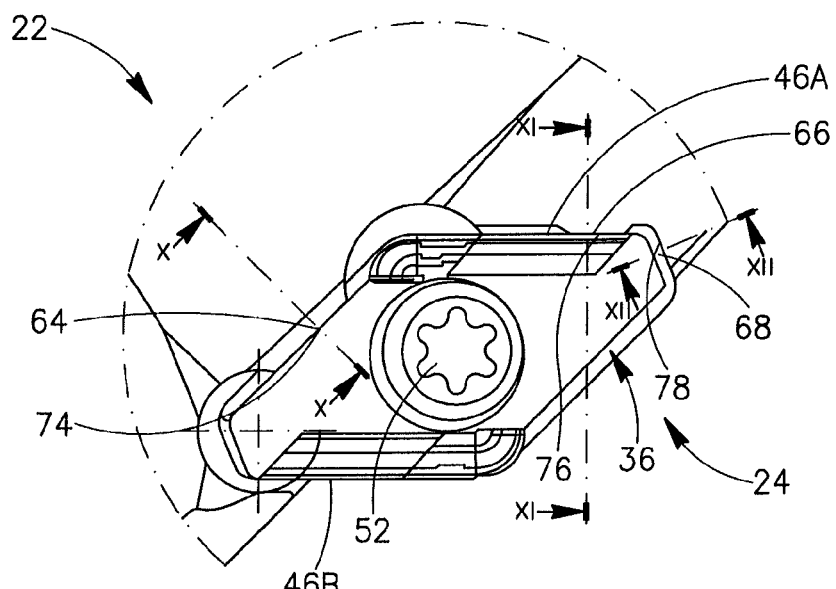
*FIG. 9*
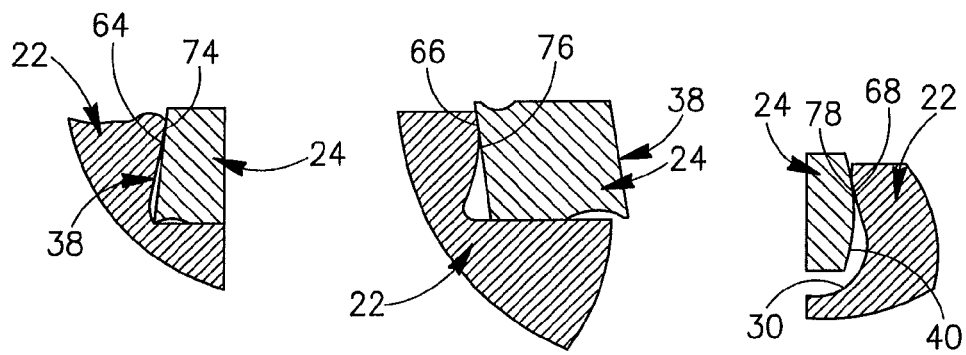
*FIG. 10A*  *FIG. 11A*  *FIG. 12A*
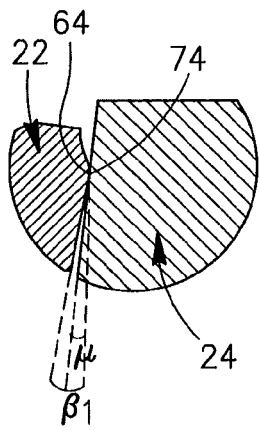 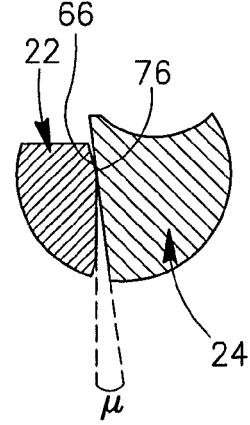 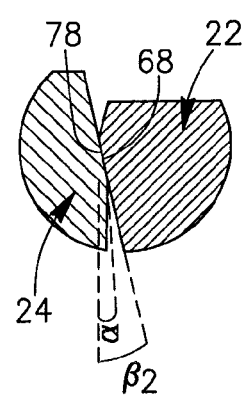
*FIG. 10B*  *FIG. 11B*  *FIG. 12B*

CUTTING INSERT AND CUTTING TOOL

FIELD OF THE INVENTION

The present invention is directed to a cutting insert and a cutting tool for such an insert. The invention is particularly directed to a chamfering and counterboring or countersinking insert for drills or milling cutters.

BACKGROUND OF THE INVENTION

In the art, single-sided cutting inserts for cutting metal and particularly chamfering and counterboring insert for drills and respective tools are known. For example, referring to FIG. 1, there is shown a drill with two such inserts. Each insert is generally rhomboidal having opposing top and bottom surfaces and a peripheral side surface extending between the top and bottom surfaces. The peripheral side surface comprises two major side surfaces of which each has two major side surface sections of which only one defines a cutting edge with the top surface. Each two major side surface sections meet at a transition edge. The cutting insert has a 180° rotational symmetry about a first axis extending through the opposing top and bottom surfaces (see FIG. 2). The inserts are supported in the drill via two abutment surfaces and a fixation screw.

DE-A-3610016 relates to a drill with chip disposal flutes, at least one first cutting edge provided at the tip, and a ring which is arranged on the drill and is provided with at least one second cutting edge which is arranged at a certain distance from the first cutting edge in order to chamfer, countersink or counterbore the hole drilled by the first cutting edge. The ring is provided with recesses which are arranged opposite the flutes and form chip passages with the latter.

The prior art single-sided cutting inserts are indexable in one plane only, and have at most two cutting edges per direction of rotation of the drill. Moreover, the transition edge at which the major side surface sections meet prevents clearance between the insert and the workpiece, thereby limiting the depth of cut. Furthermore, clamping relies on the fixation screw and two abutment surfaces only.

SUMMARY OF THE INVENTION

The present invention provides a cutting tool comprising an insert holder for releasably retaining a double-sided cutting insert, particularly a chamfering and counterboring or countersinking insert for drills. The cutting insert comprises opposing top and bottom surfaces, and a peripheral side surface extending therebetween. The peripheral side surface preferably comprises two opposing major side surfaces, wherein each major side surface comprises two distinct sections joined via a transition surface extending between the top and bottom surfaces. Preferably each of the distinct sections defines a relief surface. More preferably, each of the two relief surfaces of each of the two major side surfaces defines one major cutting edge with the top or the bottom surface of the insert. Preferably one of the two distinct relief surfaces defines a major cutting edge with the top surface of the insert wherein the second relief surface defines a major cutting edge with the bottom surface of the insert. The peripheral side surface further comprises two opposing minor side surfaces, wherein the two opposing major side surfaces are joined via the two opposing minor side surfaces. The insert preferably has a generally rhomboid form.

The insert according to the present invention is preferably indexable and has a 180° rotational symmetry about a first axis extending substantially perpendicular through the opposing top and bottom surfaces and a 180° rotational symmetry about a second axis extending substantially perpendicular to said first axis. The cutting insert also has 180° rotational symmetry about a third axis which is substantially perpendicular to the first axis and passes through opposing minor side surfaces.

Preferably, the transition surface via which the two relief surfaces of one major side surface merge is generally cylindrical, preferably generally circularly cylindrical or elliptically cylindrical. In other words, the part of the major side surface constituting the transition surface generally forms a segment of a cylinder. Preferably, the transition surface is generally vertical and more preferably its vertical tangent is generally parallel to the first axis extending substantially perpendicular through the opposing top and bottom surfaces.

According to a further preferred embodiment, the transition surface has at least one section which defines a top transition cutting edge with the top surface and one section which defines a bottom transition cutting edge with the bottom surface. Preferably, the major cutting edge provided between one of the two relief surfaces and the top or bottom surface of the insert is tangent to the transition surface. Thus, the major cutting edge preferably smoothly merges with the respective top or bottom transition cutting edge provided between the transition surface and the top or bottom surface of the insert. The major non-cutting edges defined between the top or bottom surface and the relief surface which do not constitute cutting edges, do not smoothly merge with the respective transition cutting edge provided between the transition surface and the respective top or bottom surface of the insert since these major non-cutting edges are not tangent to the transition surface.

The relief surfaces adjacent a common minor side surface converge at a convergent angle $\alpha$ in a plane of the top or bottom surface. Said angle $\alpha$ preferably is in the range from about 25° to 65°, more preferably from about 30° to 60°, even more preferably from about 40° to 50°, and further preferably about 45°.

Furthermore, to provide clearance, each relief surface is preferably inclined with respect to the first axis at a clearance angle $\mu$, in a cross-sectional view of that relief surface. Preferably, the two relief surfaces of one major side surface are inclined in different directions but at same angle to provide the same clearance with regard to the respective major cutting edges provided on the opposing top and bottom surfaces of the insert. Preferably, each relief surface is inclined at the clearance angle $\mu$ from about ±1° to ±25° and even more preferably from about ±5° to ±15° to the first axis.

Preferably, each minor side surface is inclined at an angle $\gamma$ which varies with respect to the first axis, as seen in a side view of the cutting insert.

According to a further preferred embodiment, the peripheral side surface further comprises at least six distinct abutment sections, two of which are provided on each major side surface and one of which is provided on each one of the opposing minor side surfaces. The six distinct abutment sections constitute four abutment sets, each abutment set including at least three abutment sections, and each abutment section belonging to at least two abutment sets. Each abutment set includes first and second abutment sections located on corresponding first and second relief surfaces of a given major side surface and a third abutment section located on one of the minor side surfaces. The peripheral side surface is configured to have only one abutment set operative at a given time.

In a top view of the insert, a major cutting edge associated with a first relief surface and the top surface forms a first internal obtuse angle δ with the major non-cutting edge associated with the adjacent second relief surface and the top surface of the insert. In the top view, that same major cutting edge forms a second internal obtuse angle ϵ with the major cutting edge associated with the adjacent second relief surface; the second internal obtuse angle ϵ is greater than the first internal obtuse angle δ.

Furthermore, the insert holder provided in the cutting tool has an insert pocket that comprises a base and a securing surface, the securing surface including first, second and third support sections. Preferably, the first support section abuts the first abutment section, the second support section abuts the second abutment section and the third support section abuts the third abutment section. The third support section provides support against axial forces. Furthermore, the second support section is adjacent to the third support section, to maintain the contact with both support sections while positioning the cutting insert in its final position during mounting and securing of the cutting insert in the insert pocket.

According to a further preferred embodiment, the first support section is inclined at an angle $\beta_1$, which is greater (or equal to) than the clearance angle $\mu$. The third support section is inclined at an angle $\beta_2$, which is greater than (or equal to) the inclination angle γ of the minor side surface at a region of contact between the third section and the third abutment section.

The inclination of the support sections secures the insert to the insert holder firmly and allows better clamping. The pocket of the tool for receiving said inserts has rounded recesses for accommodating the corners of the insert to allow a proper seat of the insert in the pocket.

The present invention has the preferred advantage over the prior art that a cutting insert as well as a tool holder for such inserts is provided which overcome or reduce deficiencies of the prior art and preferably have advantages as to durability, service life or life time, accuracy, effectiveness and efficiency. Even preferably the preciseness of a cutting process can be increased by providing a more precise and longer lasting secure and reproducible position of the major cutting edge of the cutting insert in a tool holder and by preferably alternatively or more preferably additionally improving resistance to forces applied to the cutting insert or the tool holder, e.g. during a cutting operation. Further or additional preferred advantages of the present invention are obvious from the general discussion above as well as the detailed discussion of preferred embodiments as provided below. In particular, the cutting insert of the present invention allows the provision of four indexable major cutting edges thereby improving lifetime and effectiveness of the insert. Also, by provision of an additionally abutment surface, better clamping and positioning of the insert becomes possible. This preferably allows the insert to be used for tougher cutting conditions. Furthermore, the third support or abutment section in the discussed orientation to the other section preferably allows the insert to rotate to its final position in the insert holder while maintaining a contact with both support sections at the same time. Moreover, the transition surface allows a deeper cut.

BRIEF DESCRIPTION OF THE FIGURES

For a better understanding of the present invention and to show how the same may be carried out in practice, reference will now be made to the accompanying drawings, in which:

FIG. 9 shows a schematic detailed top view of the tool holder shown in FIG. 3 with the cutting insert seated in the tool holder;

FIG. 10A shows a schematic cross-section of the tool holder and the cutting insert, taken along line X-X in FIG. 9;

FIG. 10B shows an enlarged view of part of FIG. 10A;

FIG. 11A shows a schematic cross-section of the tool holder and the cutting insert, taken along line XI-XI in FIG. 9;

FIG. 11B shows an enlarged view of part of FIG. 11A;

FIG. 12A shows a schematic cross-section of the tool holder and the cutting insert, taken along line XII-XII in FIG. 9; FIG. 12B shows an enlarged view of part of FIG. 12A.

DETAILED DESCRIPTION OF THE INVENTION

Figure 1:
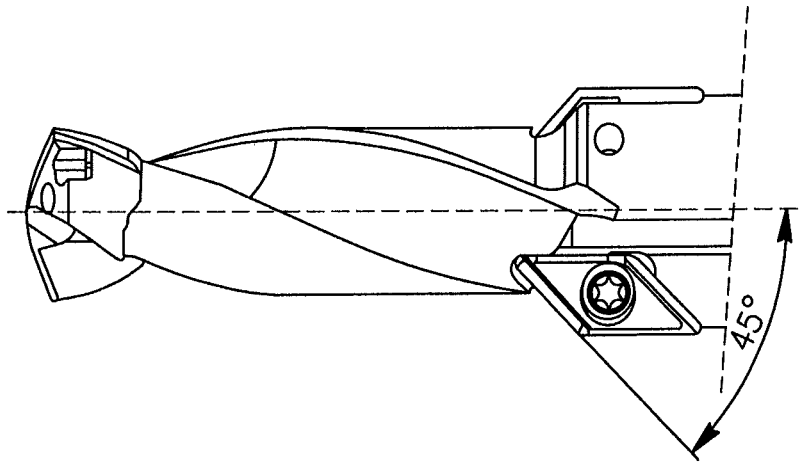
FIG. 1 shows a schematic view of a tool holder with a cutting insert of the prior art.
Figure 2:
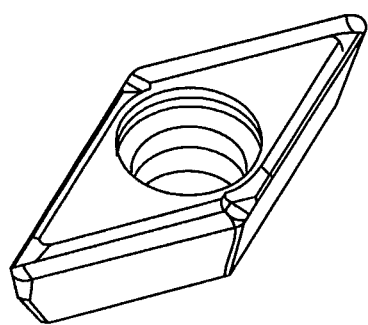
FIG. 2 shows a schematic perspective view of the cutting insert of the prior art shown in FIG. 1.
Figure 3:
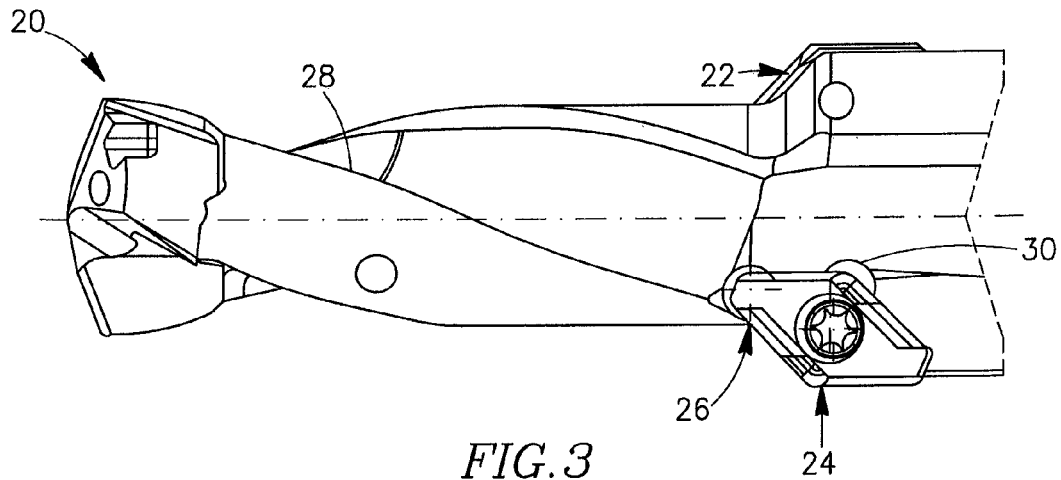
FIG. 3 shows a schematic side view of a tool holder with a cutting insert according to embodiments of the present invention.

Attention is first drawn to FIG. 3 showing a cutting tool 20 in accordance with the present invention. The cutting tool 20 may be used for metal cutting operations such as chamfering and counterboring or countersinking for drills or milling cutters. The cutting tool 20 has an insert holder 22 with a double-sided cutting insert 24 retained in an insert pocket 26 and flutes 28 for chip evacuation. The insert pocket 26 has rounded recesses 30 to accommodate corners of the insert 24.

Figure 4:
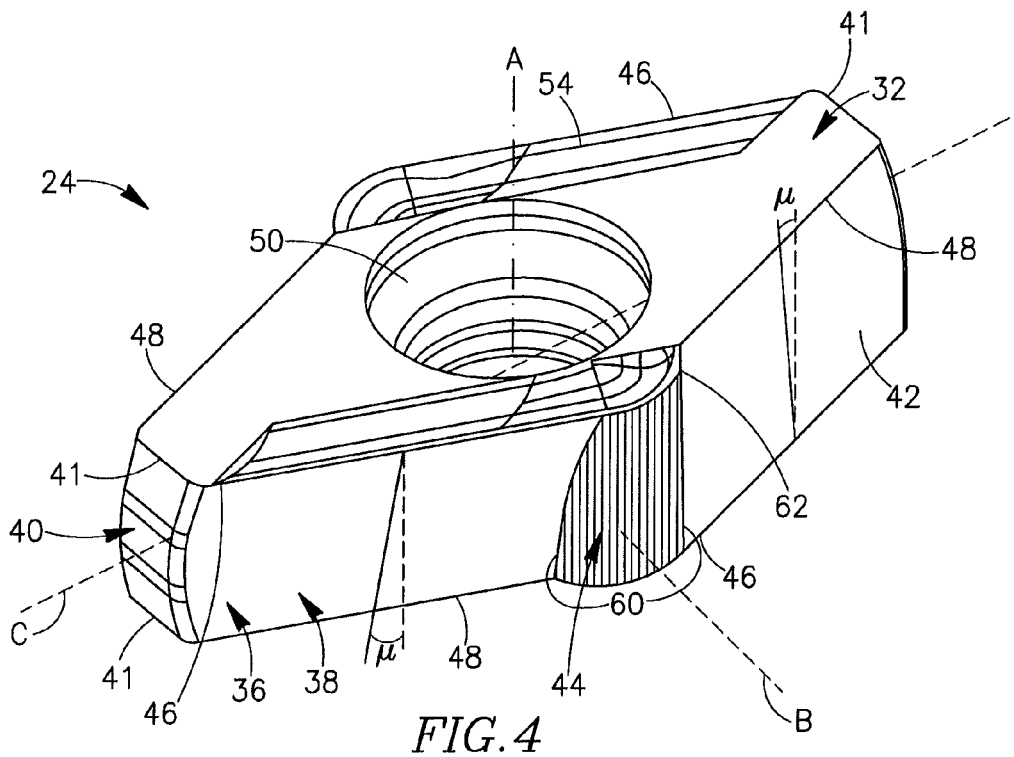
FIG. 4 shows a schematic perspective top view of the cutting insert, shown in FIG. 3.

FIG. 4 shows the cutting insert 24 from a perspective top view. The cutting insert 24 has unitary one-piece construction with a generally rhomboidal body and has two identical opposed top and bottom surfaces 32, 34 and a peripheral side surface 36 extending between the top and bottom surfaces 32, 34. The distinction between the top and bottom surfaces 32, 34 does not restrict the discussed insert, particularly the discussed indexable insert, to a particular orientation, but merely serves to clearly define the features of the insert by reference to two distinct top and bottom main surfaces.

The peripheral side surface 36 has two identical opposed major side surfaces 38 and two identical opposed minor side surfaces 40. The two opposed major side surfaces 38 are joined via the two opposed minor side surfaces 40. Each major side surface 38 has two distinct relief surfaces 42 joined via a transition surface 44 which differs in appearance from the minor side surfaces 40.

A first of the two relief surfaces 42 on each major side surface 38 defines a major cutting edge 46 with the top surface 32 of the insert and a major non-cutting edge 48, which does not constitute a cutting edge, with the bottom surface 34 of the insert. Meanwhile, an adjacent, second of the two relief surfaces 42 defines a major cutting edge 46 with the bottom surface 34 of the insert and a major non-cutting edge 48 with the top surface 32 of the insert. The minor side surfaces 40 form minor non-cutting edges 41 with both the top and bottom surfaces 32, 34, respectively.

Figure 6:
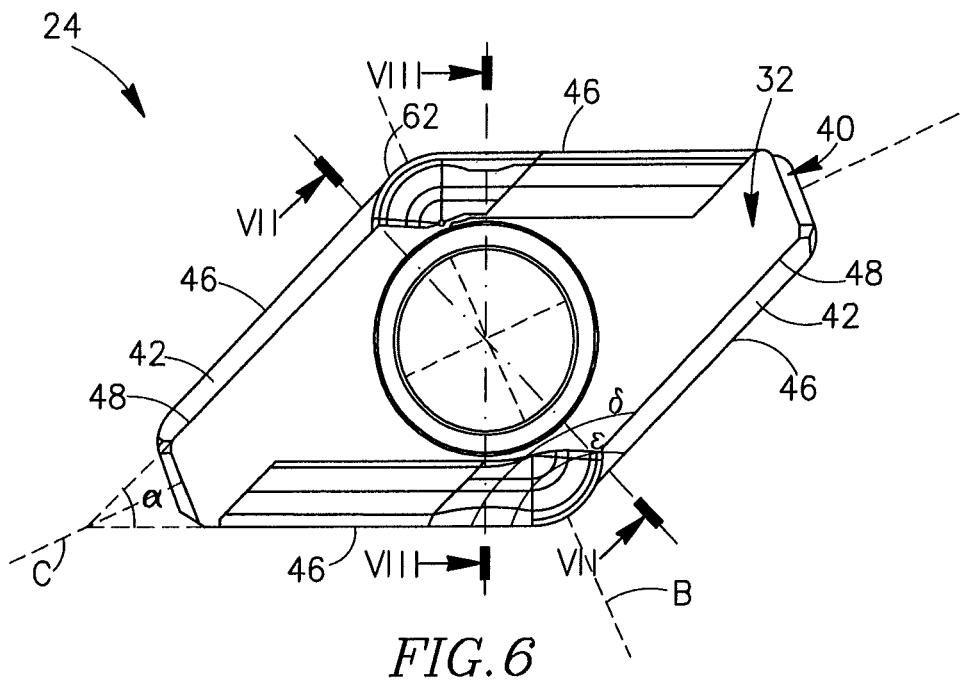
FIG. 6 shows a schematic top view of the cutting insert shown in FIG. 4.

As seen in FIG. 6, in a top view of the insert, a major cutting edge 46 associated with a first relief surface 42 (hidden in FIG. 6) and the top surface 32 forms a first internal obtuse angle δ with the major non-cutting edge 48 associated with the adjacent second relief surface 42 and the top surface 32 of the insert. In the top view, that same major cutting edge 46 forms a second internal obtuse angle ε with the major cutting edge 46 associated with the adjacent second relief surface 42; the second internal obtuse angles ε0 is greater than the first internal obtuse angle δ (i.e., ε>δ).

The cutting insert 24 according to the present invention preferably comprises a first axis A extending substantially perpendicular through the opposed top and bottom surfaces 32, 34 and a second axis B extending substantially perpendicular to the first axis A and passing through the opposing transition surfaces 44. These axes are preferably axes of symmetry. The insert is indexable as specified and has a 180° rotational symmetry about the first axis A and a 180° rotational symmetry about the second axis B. As seen in FIG. 6, the cutting insert also comprises a third axis C which is substantially perpendicular to first axis A and passes through the opposing minor side surfaces 40. The third axis C is also an axis of symmetry and so the insert has 180° rotational symmetry about the third axis C. It is noted, however, that rotating the insert 180° around axis C presents the four major cutting edges in the same exact position as first rotating the insert 180° around axis B to an intermediate position and then rotating the insert 180° around axis A. It is further noted if the relief surfaces associated with each major side surface are the same length, i.e., if the cutting insert is generally rhomboidal, then the third axis C is substantially perpendicular to the second axis B.

Furthermore, the insert preferably comprises a through-bore 50 extending between the top and bottom surfaces 32, 34 for fixing the insert in the insert holder 22 by a fixation screw 52, said first axis A preferably corresponds to the axis of the through-bore 50. The top and bottom surfaces 32, 34 each have rake surfaces 54 extending from the major cutting edge 46 towards the through-bore 50.

Figure 5:
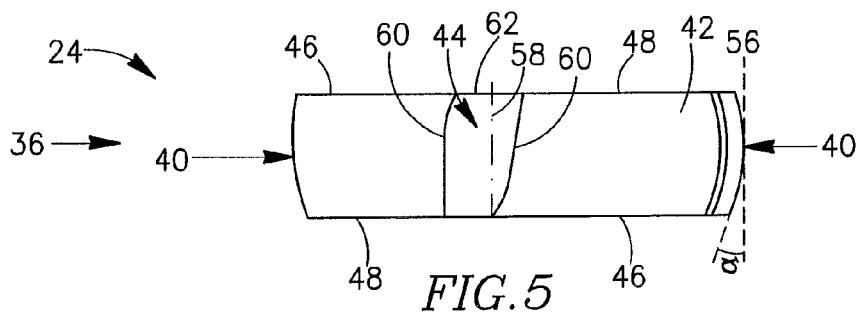
FIG. 5 shows a schematic side view of the cutting insert shown in FIG. 4.

In general, the relief surfaces 42 associated with a common major side surface 38 are inclined in opposite directions relative to the first axis (A), but merge at the transition surface 44 which accommodates their differences in inclination. In accordance with some embodiments, the transition surface 44 may be described as a segment of a cylinder. The cylinder may have any desired cross sectional shape. In some embodiments the transition surface 44 may be a segment of a circular cylinder. In some embodiments the transition surface 44 may be a segment of an elliptical cylinder. The transition surface 44 is generally vertically extending and substantially perpendicular to the opposed top and bottom surfaces 32, 34 and preferably its vertical tangent 58 is generally parallel to the first axis A (see also FIG. 5). Although the transition surface 44 is generally preferred as having a substantially uniform radius, the radius may also vary, e.g., as seen in a top or bottom view of the cutting insert 24. Accordingly, in some embodiments, the join 60 between the transition surface 44 and each relief surface 42 is a line or a three-dimensional curve. In accordance with a preferred embodiment, the major cutting edge 46 is tangent to the transition surface 44 at the top or bottom surface 32, 34. The major cutting edge 46 merges with a transition cutting edge 62 defined between the transition surface 44 and the top or bottom surface 32, 34 of the insert. Each transition surface 44 has a top transition cutting edge 62 defined between the transition surface 44 and the top surface 32 and a bottom transition cutting edge 62 defined between the transition surface 44 and the bottom surface 34. The major non-cutting edge 48 is not tangent to the transition surface 44, and therefore does not merge with the transition cutting edge 62 defined between the transition surface 44 and the top or bottom surface 32, 34 of the insert. Each minor side surface 40 may be generally curved or partially curved and partially flat.

In a side view of the cutting insert 24, each point on each minor side surface 40 is inclined at an angle γ to the first axis A, or equivalently, to a vertical line 56 parallel to the first axis A. The angle γ may vary along each minor side surface 40 from the top surface 32 to the bottom surface 34 as seen from a side view.

The relief surfaces 42 adjacent a common minor side surface 40 converge at a convergent angle α in a plane of the top or bottom surface 32, 34. Said angle α preferably is in the range from about 25° to 65°, more preferably from about 30° to 60°, even more preferably from about 40° to 50°, and further preferably about 45°.

Figure 7:
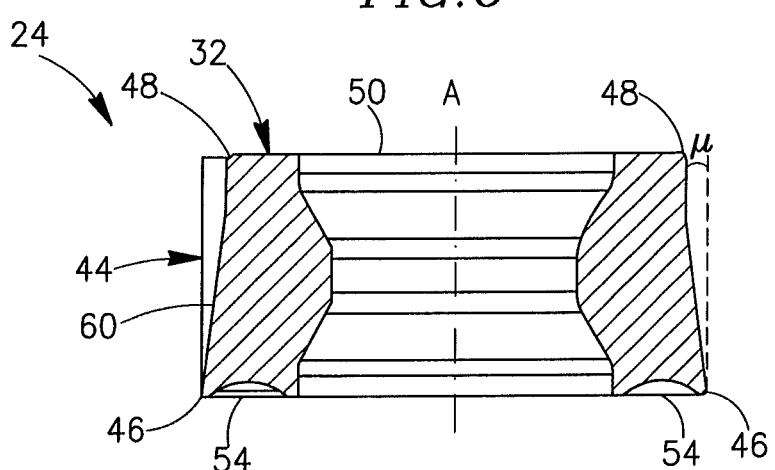
FIG. 7 shows a schematic cross-section of the cutting insert, taken along line VII-VII in FIG. 6.
Figure 8:
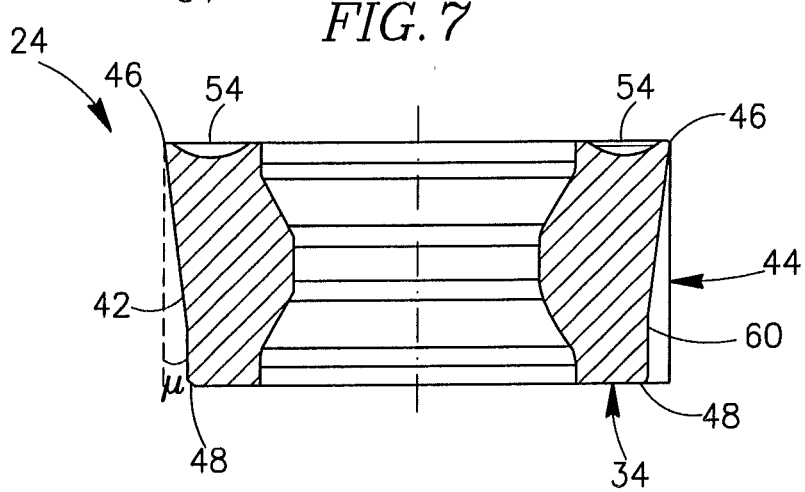
FIG. 8 shows a schematic cross-section of the cutting insert, taken along line VIII-VIII in FIG. 6.

Each relief surface 42 is preferably inclined at an angle μ to the first axis A (i.e., to the vertical line 56), in a cross-sectional view of that relief surface. During cutting operations, the inclination provides clearance between a major cutting edge 46 associated with that relief surface 42 and a workpiece. The two relief surfaces 42 of one major side surface 38 are inclined at the same angle in different or opposing directions to maintain the features of the indexable insert. The inclination can be seen well in FIGS. 4, 7 and 8. Preferably, the clearance angle μ is from about ±1° to ±25° and even more preferably from about ±5° to ±15°.

Attention is now drawn to FIGS. 9-12 showing the cutting insert 24 retained in the cutting tool 20 in accordance with the present invention. The peripheral side surface 36 has six distinct abutment sections. Each major side surface 38 has first and second abutment sections 64, 66 located on respective relief surfaces 42 and each minor side surface 40 has a third abutment section 68. The six distinct abutment sections constitute four abutment sets, each abutment set including at least three abutment sections, and each abutment section belonging to at least two abutment sets. Each abutment set includes first and second abutment sections located on corresponding first and second relief surfaces of a given major side surface and a third abutment section located on one of the minor side surfaces. The peripheral side surface is configured to have only one abutment set operative at a given time. Thus, in each seating orientation, the first and second abutment sections 64, 66 of one of the major side surfaces 38 serve as operative first and second abutment sections 64, 66 and one of the third abutment sections 68 serves as an operative third abutment section 68.

Figure 13:
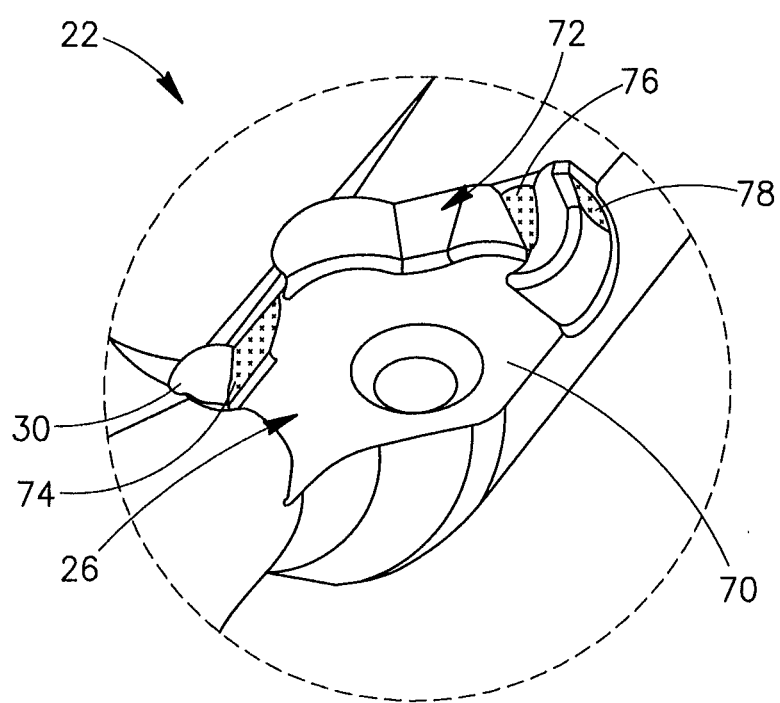
FIG. 13 shows an enlarged schematic perspective view of an insert pocket provided in the tool holder in accordance with the embodiment of the invention.

FIG. 13 shows the insert pocket 26 which has a base 70 and a securing surface 72 extending from the base 70 which includes first, second and third support sections 74, 76, 78. The first support section 74 abuts the operative first abutment section 64, the second support section 76 abuts the operative second abutment section 66 and the third support section 78 abuts the operative third abutment section 68 (See FIGS. 9 to 12). The second support section 76 is adjacent to the third support section 78. Each support section abuts a corresponding abutment section at a region (or point) of contact. The addition of the third support section 78 provides better clamping, in comparison with the prior art, which can withstand tougher cutting conditions. The third support section 78 resists axial forces and therefore contributes to retaining the cutting insert 24 securely in the insert holder 22. Accurate clamping is attained, since the location of the third support section 78 adjacent to the second support section 76 allows the insert 24 to rotate to its final position while maintaining a contact with both supports at the same time when securing the cutting insert 24 in the insert pocket 26.

As seen in FIG. 9, the second abutment section 66, which is situated between the first and third abutment sections 64, 68 along the peripheral side surface, has an associated non-operative major cutting edge 46A which opposes an operative major cutting edge 46B when the cutting insert is seated.

FIGS. 10-12 show the inclination of the various support and abutment sections. The first support section 74 is inclined at a first angle $\beta_1$ to the first axis A (i.e., to the vertical line 56). The first angle $\beta_1$ may be greater than, or equal to, the clearance angle $\mu$. The third section 78 is inclined at a second angle $\beta_2$ to the first axis A (i.e., to the vertical line 56). The second angle $\beta_2$ may be greater than, or equal to, the angle $\gamma$ at the region (or point) of contact between the third section 78 and the third abutment section 68. The inclination of the support sections 74, 78 decreases the tension on the fixation screw 52 caused by the cutting forces.

The present invention provides a new cutting tool 20 with a new double-sided cutting insert 24 which may be used in conjunction with a drill for chamfering and counter boring or countersinking with the advantage of four major cutting edges 46, as opposed to two major cutting edges in the prior art single-sided cutting inserts, to improve the life time of the cutting insert 24, a cylindrical transition surface 44 to allow a deeper cut, clearance with the workpiece and accurate clamping which can withstand tougher cutting conditions. The accurate clamping provided due to the addition of a third support section 78, the fact that the second and third support sections 76, 78 are close to each other and by the inclination of the support sections 74, 78.

Although the present invention has been described to a certain degree of particularity, it should be understood that various alterations and modifications could be made without departing from the scope of the invention as hereinafter claimed.

What is claimed is:

1. A double-sided cutting insert comprising:
   opposing top and bottom surfaces and a peripheral side surface extending therebetween;
   wherein:
   the peripheral side surface comprises at least two opposing major side surfaces, each of which has at least two distinct relief surfaces, each relief surface defining a major cutting edge with the top or bottom surface;
   the two relief surfaces are joined via a transition surface extending between the top and bottom surfaces;
   the peripheral side surface comprises two opposing minor side surfaces forming minor non-cutting edges with both the top and bottom surfaces, wherein the two opposing major side surfaces are joined via the two opposing minor side surfaces;
   the cutting insert generally has 180° rotational symmetry about a first axis (A) extending through the opposing top and bottom surfaces and 180° rotational symmetry about a second axis (B) extending substantially perpendicular to said first axis; and
   a through-bore extending axially along the first axis (A).

2. The double-sided cutting insert in accordance with claim 1, wherein the transition surface is formed as a segment of a cylinder.

3. The double-sided cutting insert in accordance with claim 2, wherein the transition surface is generally vertical and has a vertical tangent that is generally parallel to the first axis.

4. The double-sided cutting insert in accordance with claim 3, wherein the transition surface has at least two opposing sections, one of the sections defines a top transition cutting edge with the top surface and one of the sections defines a bottom transition cutting edge with the bottom surface.

5. The double-sided cutting insert in accordance with claim 4, wherein:
   the major cutting edges are tangent to the transition surface; and
   major non-cutting edges which are defined between the top or bottom surface and the relief surface and do not constitute cutting edges, are not tangent to the transition surface.

6. The double-sided cutting insert in accordance with claim 1, wherein:
   the relief surfaces adjacent a common minor side surface converge at a convergent angle ($\alpha$) in a plane of the top or bottom surface.

7. The double-sided cutting insert in accordance with claim 6, wherein the convergent angle ($\alpha$) is from about 40° to 50°.

8. The double-sided cutting insert in accordance with claim 1, wherein:
   the relief surfaces are inclined at a non-zero clearance angle ($\mu$) with respect to the first axis, in a cross-sectional view.

9. A double-sided cutting insert comprising:
   opposing top and bottom surfaces and a peripheral side surface extending therebetween;
   wherein:
   the peripheral side surface comprises at least two opposing major side surfaces, each of which has at least two distinct relief surfaces, each relief surface defining a major cutting edge with the top or bottom surface;
   the two relief surfaces are joined via a transition surface extending between the top and bottom surfaces;
   the peripheral side surface comprises two opposing minor side surfaces, wherein the two opposing major side surfaces are joined via the two opposing minor side surfaces;
   the cutting insert generally has 180° rotational symmetry about a first axis (A) extending through the opposing top and bottom surfaces and 180° rotational symmetry about a second axis (B) extending substantially perpendicular to said first axis; and
   a through-bore extending axially along the first axis (A);
   wherein:
   the relief surfaces are inclined at a non-zero clearance angle ($\mu$) with respect to the first axis, in a cross-sectional view; and
   the relief surfaces of each major side surface are inclined in different directions.

10. The double-sided cutting insert in accordance with claim 9, wherein the clearance angle ($\mu$) is from about ±5° to ±15° with respect to the first axis.

11. The double-sided cutting insert in accordance with claim 1, wherein:
   each minor side surface is inclined at an angle ($\gamma$) to the first axis; and
   the angle ($\gamma$) varies from the top surface to the bottom surface, as seen in a side view of the cutting insert.

12. A double-sided cutting insert comprising:
   opposing top and bottom surfaces and a peripheral side surface extending therebetween;
   wherein:
   the peripheral side surface comprises at least two opposing major side surfaces, each of which has at least two distinct relief surfaces, each relief surface defining a major cutting edge with the top or bottom surface;

the two relief surfaces are joined via a transition surface extending between the top and bottom surfaces;

the peripheral side surface comprises two opposing minor side surfaces, wherein the two opposing major side surfaces are joined via the two opposing minor side surfaces;

the cutting insert generally has 180° rotational symmetry about a first axis (A) extending through the opposing top and bottom surfaces and 180° rotational symmetry about a second axis (B) extending substantially perpendicular to said first axis; and a through-bore extending axially along the first axis (A) wherein:

the peripheral side surface has at least six distinct abutment sections;

the six distinct abutment sections constitute four abutment sets, each abutment set including at least three abutment sections, and each abutment section belonging to at least two abutment sets;

each abutment set includes first and second abutment sections located on corresponding first and second relief surfaces of a given major side surface and a third abutment section located on one of the minor side surfaces; and the peripheral side surface is configured to have only one abutment set operative at a given time.

13. The double-sided cutting insert in accordance with claim 1 having a generally rhomboidal form.

14. A cutting tool comprising:

an insert holder having an insert pocket comprising a base and a securing surface extending from the base, the securing surface including first, second and third support sections; and a cutting insert releasably retained in the insert pocket, the cutting insert being in accordance with claim 1;

and wherein:

the first support section abuts a first abutment section formed on one relief surface of a major side surface of the cutting insert;

the second support section abuts a second abutment section formed on another relief surface of the same major side surface of the cutting insert;

the third support section abuts a third abutment section formed on a minor side surface of the cutting insert;

the second abutment section is between the first and third abutment section along the peripheral side surface; and the second abutment section has an associated non-operative major cutting edge which opposes an operative major cutting edge of the cutting tool.

15. The cutting tool in accordance with claim 14, wherein:

the relief surfaces are inclined at a clearance angle ($\mu$) with respect to the first axis (A), in a cross-sectional view;

the first support section is inclined at a first angle ($\beta_1$) to the first axis, the first angle being greater than, or equal to, the clearance angle ($\mu$);

the third support section is inclined at a second angle ($\beta_2$) to the first axis;

each minor side surface of the cutting insert is inclined at an angle ($\gamma$) to the first axis, the angle ($\gamma$) varying from the top surface to the bottom surface, as seen in a side view of the cutting insert; and the second angle ($\beta_2$) is greater than, or equal to, the angle ($\gamma$) at a region of contact between the third section and the third abutment section.

16. A double-sided cutting insert comprising:

opposing top and bottom surfaces;

a peripheral side surface extending between the top and bottom surfaces and comprising two opposing major side surfaces joined by two opposing minor side surfaces;

a through bore extending between the top and bottom surfaces along a first axis (A);

distinct first and second relief surfaces formed in each major side surface, each relief surface being inclined at a non-zero clearance angle ($\mu$) with respect to the first axis (A), in a cross-sectional view of that relief surface;

a transition surface formed in each major side surface, the transition surface extending between the top and bottom surfaces, the first and second relief surfaces being joined via the transition surface;

a first major cutting edge defined between the first relief surface of each major side surface and the top surface; and a second major cutting edge defined between the second relief surface of said each major side surface and bottom surface;

a first major non-cutting edge defined between the first relief surface of said each major side surface and the bottom surface; and a second major non-cutting edge defined between the second relief surface of said each major side surface and the top surface;

wherein:

the cutting insert has 180° rotational symmetry about the first axis (A); and the cutting insert has 180° rotational symmetry about a second axis (B) which is substantially perpendicular to the first axis (A).

17. The double-sided cutting insert in accordance with claim 16, wherein:

in a top view of the insert:

a major cutting edge associated with the first relief surface and the top surface form a first internal obtuse angle ($\delta$) with the major non-cutting edge associated with the adjacent second relief surface; and that same major cutting edge forms a second internal obtuse angle ($\epsilon$) with the major cutting edge associated with the adjacent second relief surface; and the second internal obtuse angle ($\epsilon$) is greater than the first internal obtuse angle ($\delta$).

18. The double-sided cutting insert in accordance with claim 16, wherein:

the second axis (B) passes through opposing transition surfaces; and the cutting insert also has 180° rotational symmetry about a third axis (C) which is substantially perpendicular to the first axis (A) and passes through opposing minor side surfaces.

19. The double-sided cutting insert in accordance with claim 16, wherein:

the transition surface is formed as a segment of a cylinder; and the transition surface extends from the top surface to the bottom surface along the major side surface.

20. The double-sided cutting insert in accordance with claim 16, wherein:

the transition surface has at least two opposing sections;

a first section defines a top transition cutting edge with the top surface;

a second section defines a bottom transition cutting edge with the bottom surface;

the first major cutting edge merges with the top transition cutting edge; and the second major cutting edge merges with the bottom transition cutting edge.

21. The double-sided cutting insert in accordance with claim 16, wherein:

the major cutting edges are tangent to the transition surface; and the major non-cutting edges are not tangent to the transition surface.

22. The double-sided cutting insert in accordance with claim 16, wherein:

the relief surfaces adjacent a common minor side surface converge at a convergent angle ($\alpha$) in a plane of the top or bottom surface; and the convergent angle ($\alpha$) is from about 40° to 50°.

23. The double-sided cutting insert in accordance with claim 16, wherein:

the relief surfaces of a given major side surface are inclined in different directions with respect to the first axis (A), in cross-sectional views taken through each relief surface.

24. The double-sided cutting insert in accordance with claim 23, wherein:

the relief surfaces are inclined at a clearance angle ($\mu$) that is from about ±5° to ±15° with respect to the first axis (A).

25. The double-sided cutting insert in accordance with claim 16, wherein:

the peripheral side surface has at least six distinct abutment sections;

the six distinct abutment sections constitute four abutment sets, each abutment set including at least three abutment sections, and each abutment section belonging to at least two abutment sets;

each abutment set includes first and second abutment sections located on corresponding first and second relief surfaces of a given major side surface and a third abutment section located on one of the minor side surfaces; and the peripheral side surface is configured to have only one abutment set operative at a given time.

26. A cutting tool comprising:

an insert holder having an insert pocket comprising a base and a securing surface extending from the base, the securing surface including first, second and third support sections; and a cutting insert releasably retained in the insert pocket, the cutting insert being in accordance with claim 16;

and wherein:

the first support section abuts a first abutment section formed on one relief surface of a major side surface of the cutting insert;

the second support section abuts a second abutment section formed on another relief surface of the same major side surface of the cutting insert;

the third support section abuts a third abutment section formed on a minor side surface of the cutting insert;

the second abutment section is between the first and third abutment section along the peripheral side surface; and the second abutment section has an associated non-operative major cutting edge which opposes an operative major cutting edge of the cutting tool.

* * * * *